C. W. REYNOLDS.
HIGH CHAIR.
APPLICATION FILED SEPT. 11, 1918.
1,292,646.
Patented Jan. 28, 1919.
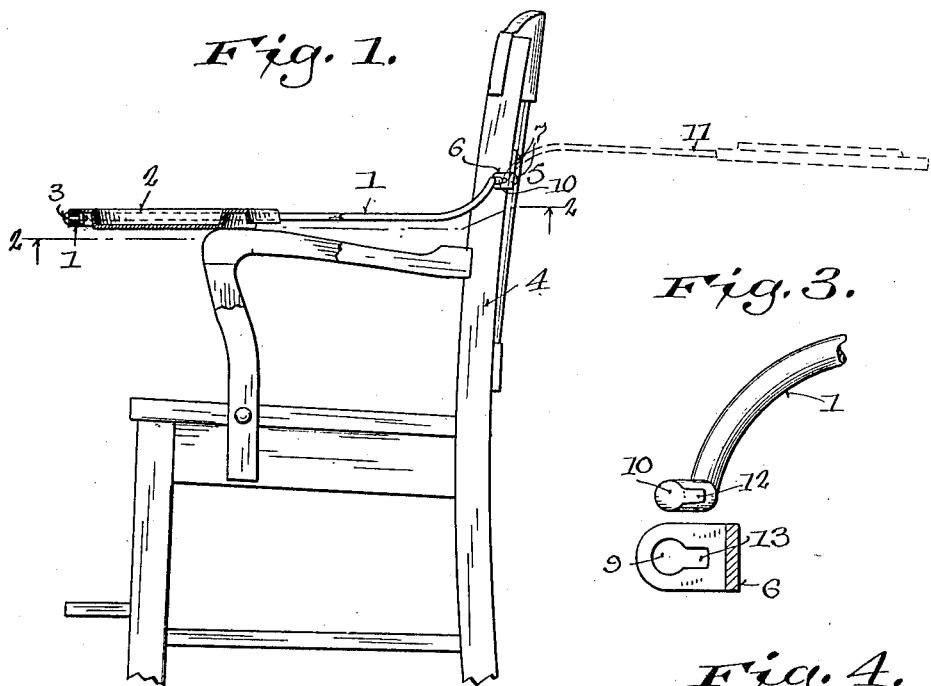
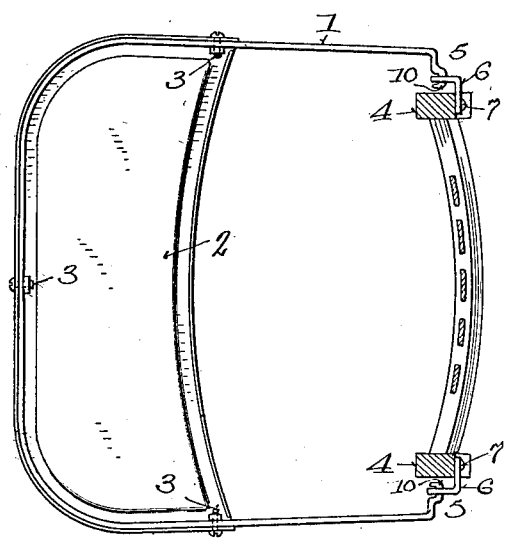
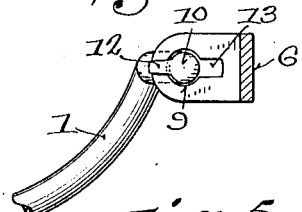
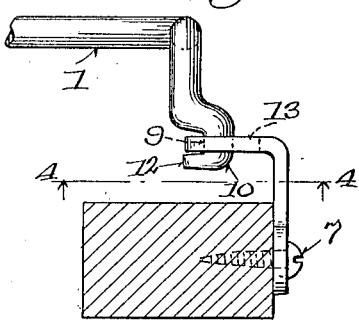
Inventor
Clifford W. Reynolds
By Ennis F. Whalen
Attorneys.

UNITED STATES PATENT OFFICE.

CLIFFORD W. REYNOLDS, OF FORT ATKINSON, WISCONSIN.

HIGH CHAIR.

1,292,646.　　　　　Specification of Letters Patent.　　Patented Jan. 28, 1919.

Application filed September 11, 1918. Serial No. 253,540.

*To all whom it may concern:*

Be it known that I, CLIFFORD W. REYNOLDS, a citizen of the United States, residing at Fort Atkinson, county of Jefferson, and State of Wisconsin, have invented new and useful Improvements in High Chairs, of which the following is a specification.

My invention relates to improvements in high chairs, and it pertains more especially to the device for detachably attaching the tray to the back of a chair, whereby the same may be readily detached for the purpose of washing and cleaning, and the same is explained by reference to the accompanying drawing, in which—

Figure 1 represents a side view of a high chair provided with my detachable tray, the dotted lines of which indicate the position of the tray preparatory to removing the same.

Fig. 2 is a bottom plan view, drawn on line 2—2 of Fig. 1.

Fig. 3 is a detail view showing one of the tray supporting fastening arms, and the retaining eye to which such arm is temporarily secured.

Fig. 4 is a section on the line 4—4 of Fig. 5, showing the arm in its locked position.

Fig. 5 shows the parts referred to and shown in Figs. 3 and 4, showing one of the arms connected with one side of a chair.

Like parts are referred to by the same reference figures throughout the several views.

The bail 1 is connected with the tray 2 by a plurality of bolts 3, and said bail 1 is detachably connected with the rear arms 4—4 of the chair by flexible joints 5, each joint comprising the rigidly fixed arms 6, which arms are secured to the chair arm by the screw 7, and said arms 6 are each provided with an eye 9 for the reception of bent members 10 formed on each end of said bail. The eye 9 and member 10 are so formed that when said bail 1 is thrown back, as indicated by the dotted lines 11, they will readily spring apart, and be thus pivotally disconnected, whereby as soon as said bail is thrown forward said parts will become so interlocked that they will not be accidentally disengaged, the flexible joint being what is generally called a bayonet joint, comprising the rounded or cylindrical member 10 which nicely fits the round hole 9 and the lug 12, which nicely fits the angular aperture 13 when said bail 1 is thrown rearward, but which lug is thrown forward, as shown in Figs. 4 and 5, whereby said bail is securely retained in place as shown in Fig. 1.

Having thus described my invention what I claim as new, and desire to secure by Letters Patent, is,

1. The combination in a high chair, of a tray, a tray supporting bail, the respective ends of which bail are each provided with an angular bend, a pair of brackets rigidly secured to the back of such chair, said brackets each provided with a round aperture, and an angular aperture extending from said round aperture, said brackets also being adapted when said bail is thrown back to receive the same, and to become disengaged therefrom.

2. The combination in a high chair, of a tray, a tray supporting bail, the respective ends of which bail are each provided with an angular bend, a pair of brackets rigidly secured to the back of such chair, said brackets being adapted when said bail is thrown back to receive the same, and to become disengaged therefrom, and to hold said bail in place when thrown forwardly.

In testimony whereof I affix my signature in the presence of two witnesses.

CLIFFORD W. REYNOLDS.

Witnesses:
N. O. LAROLD,
T. A. RITTER.

Copies of this patent may be obtained for five cents each, by addressing the "Commissioner of Patents, Washington, D. C."